United States Patent
Fassauer

[11] Patent Number: 5,263,305
[45] Date of Patent: Nov. 23, 1993

[54] APPARATUS WITH GLIDE PLATE MEMBER AND PRESSURE SEAL

[76] Inventor: Arthur L. Fassauer, 420 Foster La., Canyon, Tex. 79015

[21] Appl. No.: 809,470

[22] Filed: Dec. 18, 1991

Related U.S. Application Data

[63] Continuation-in-part of Ser. No. 528,718, May 24, 1990, which is a continuation-in-part of Ser. No. 395,799, Aug. 18, 1989, abandoned.

[51] Int. Cl.⁵ .......................................... A01D 87/00
[52] U.S. Cl. .................................. 56/12.8; 15/300.01
[58] Field of Search ............................... 56/12.8–13.4, 56/DIG. 1, DIG. 3, 320.1, 320.2, 12.9, 13.1–13.3, 16.7, 17.1, 475, 479; 15/300.01

[56] References Cited

U.S. PATENT DOCUMENTS

| | | | |
|---|---|---|---|
| 4,817,372 | 4/1989 | Toda et al. | 56/12.8 |
| 5,048,275 | 9/1991 | Fassauer | 56/12.8 |
| 5,101,615 | 4/1992 | Fassauer | 56/12.8 |

*Primary Examiner*—Thuy M. Bui
*Attorney, Agent, or Firm*—Ross, Howison, Clapp & Korn

[57] ABSTRACT

An air pressure activated apparatus includes a substantially endless housing and an underlying plate member. The plate member has a variety of different constructions for providing enhanced air flow and pressure distribution for improved flotation, grass cutting, mulching, or vacuum cleaning while making it more difficult to contact moving parts within the housing.

14 Claims, 11 Drawing Sheets

APPARATUS WITH GLIDE PLATE MEMBER AND PRESSURE SEAL

This application is a continuation-in-part of prior copending application Ser. No. 07/528,718, filed May 24, 1990, which was a continuation-in-part of prior copending application Ser. No. 07/395,799, filed Aug. 18, 1989, abandoned.

TECHNICAL FIELD OF THE INVENTION

This invention relates generally to apparatus, such as lawn mowers, lawn trimming apparatuses, vacuum cleaners and the like, and in particular to apparatus in which at least a portion of the apparatus is pressurized to float the apparatus on a cushion of air or to otherwise benefit from differential pressures.

BACKGROUND OF THE INVENTION

Lawn mowers are in common use for cutting grass and other vegetation to a desired height. Lawn trimmers and edgers are also used to cut grass, weeds and the like along the borders of lawns, particularly where the lawn abuts an obstruction, such as a fence or a wall. Vacuum cleaners may be used in connection with lawn care for picking up clippings, but are more commonly used in household or commercial settings to suction dirt and debris from floors and carpets.

Lawn mowers or vacuum cleaners typically include a predetermined number of wheels to support the apparatus a predetermined distance above the ground, floor or other support surface. The mower housing of the device is typically adjustable to select the desired height of the cutting blade to effect the desired cut. The vacuum housing is typically adjustable to select the desired height of brushes or suction orifices to compensate for the type of flooring or the thickness or nap of the carpet. The wheels make it difficult to maneuver the apparatus around obstacles and to otherwise turn it. Self-propelled mowers or vacuum cleaners remove some of the labor involved, but considerable effort is still required to push and pull and guide the mower or the vacuum cleaner in and around radius turns and the like.

It is known in the art to provide wheel-less grass cutting apparatus, which have a power operated rotary cutter and commonly driven air impelling means for causing air to be introduced into the mower housing and directed downward toward the ground to produce a reaction force with the ground (the so-called "ground effect"), thereby supporting the mower a small distance above the ground on a cushion of air. Air floated vacuum cleaners have not previously been known.

Prior art "air-cushioned" lawn mowers typically have a relatively narrow bottom surface or border in facing relationship with the ground, during operation, air pressure blown toward the ground by the air impelling means tends to escape from the housing between the ground and bottom surface, which substantially reduces the lifting force on the housing. The rapid escape of air along the periphery of the mower housing also stirs up debris and dust when mowing around shrubbery and the like, which makes mowing difficult and hazardous. This effect is completely contrary to the desired effect for vacuum cleaning such that it has not previously been seriously attempted. Also, because the air is blown downward to keep the housing afloat, the air pressure depresses the materials on the support surface below such as the grass, causing the cutting blade to leave an uneven cut. Other problems associated with prior art air-cushioned lawn mowers include the problem of keeping the mower on a straight cutting path and the mower housing level. Any tilting action on the housing results in an uneven cut.

The relatively narrow bottom surface of the housing also causes the mower to sink relatively deep into the grass when the mower is not in operation. As a result, upon start-up, the cutting blade will tend to "scalp" a section of the grass until it rises up to the desired cutting height by air pressure within the housing. Whether the mower is wheeled or air floated only a relatively narrow bottom surface of the housing acts to shield the internal rotating parts such as the cutting blade from the surrounding area which may be accessible to the operator. An object, such as a user's foot, might through carelessness extend past the narrow bottom surface of the housing, thereby potentially resulting in an accidental injury to the user by contact with the internal rotating mechanism especially in the case of a cutting blade.

Another disadvantage of prior art air pressure operated apparatus such as air-cushioned mowers is their inability to discharge materials such as grass cuttings through an appropriate port, or into a receptacle which leaves a windrow of grass cuttings. Conventional lawn mowers tend to vacuum up grass by the rotary action of the cutting blade, whereas in prior art air-cushioned mowers, the downwardly blown air which creates the lifting force by ground effect is not sufficient to effectively discharge grass cuttings primarily because of the escape of air from the housing. Also, the downwardly blown air tends to blow large pieces or clippings of cut, uncut, or partially cut grass downward toward the ground, which further detracts from the grass catching capability of prior art air-cushioned mowers.

Another disadvantage of prior art is that vacuum cleaner flotation was not adequately obtainable. Flotation of a vacuum cleaner has now been found to require two opposing forces, air pressure or lift or flotation simultaneously in combination with suction or vacuum means. Prior devices were not capable of adequately and simply creating and maintaining both pressure and suction simultaneously.

BRIEF SUMMARY OF THE INVENTION

It is the principal object of the invention to provide an improved differential air pressure operated apparatuses including air-floated apparatuses.

Another object of the invention is to provide an improved lawn mower which benefits as by flotation on a cushion of air during operation or otherwise benefits from differential pressure and which has improved safety and is easy to operate.

Yet another object of the invention is to provide such an improved differential pressure apparatus or an air-floated apparatus with various types of underlying plate configurations for providing a controlled flow of pressurized air within and under the housing and avoids contact of objects with the interior mechanism of the apparatus.

Still another object of the invention is to provide a differential pressure activated apparatus such as an air-floated apparatus which can effectively collect debris, grass clippings or other materials from a surface.

It is a further object to provide novel bottom plate configurations for wheeled and/or air-floated bladed apparatuses which provide desired or enhanced air flow or air pressure distribution and added strength, dependability and/or improved safety.

These and other objects are accomplished in accordance with the present invention, wherein an air pressure activated apparatus such as air-floated apparatus, a vacuum cleaner or a lawn mower, includes a housing having an open bottom and an air intake opening therein and means for pressurizing the air in at least a portion of the housing sufficient to beneficially float materials into the housing above a support surface or to float the housing or a portion of the housing above a support surface. A portion of the housing cooperates with the support surface beneath the portion of the housing to define a pressurization chamber.

In accordance with one feature of the invention, the apparatus includes means projecting from a bottom part of the housing into the chamber to direct air inwardly within the chamber, thereby substantially reducing air leakage from the chamber or otherwise maintaining a desired pressure gradient within the housing. The projecting means extends from substantially the entire bottom part of the housing to define one or more openings in the bottom. In one embodiment, the projecting means is comprised of a relatively flat plate member projecting laterally into the chamber for directing at least some of the air in the chamber substantially laterally relative to the support surface and inwardly within the chamber.

In accordance with another feature of the invention, the apparatus is an air-floated apparatus such as a lawn mower, a mulcher or a vacuum having a rotatable blade member mounted in the housing. The housing has means projecting from a bottom part thereof into the chamber to define a shelf around substantially the entire bottom part of the housing. The apparatus includes a discharge duct extending through the housing and an external receptacle for accumulating cuttings or debris discharged through the duct. The rotary action of the blade member centrifuges the cuttings or debris in the housing. The shelf cooperates with an inner wall of the housing to channel and convey the centrifuged cuttings or debris to and through the discharge duct. Alternatively, and particularly where the apparatus is a lawn mower or grass mulcher, one or more diverters are supported on the shelf to facilitate the recycling of clippings back into the path of the blade for recut and recycle to create on fine mulch.

Incorporating the plate member described above into an air-floated apparatus, such as a lawn mower, provides several advantages. In addition to reducing air leakage from the housing of the apparatus, as previously described, the plate member acts as a shelf to support grass cuttings which are thrown against an inner surface of the housing by the centrifugal force of a rotating lawn mower blade (by the tip speed thereof), thereby substantially enhancing the grass catching capability of the lawn mower. Furthermore, the plate member will direct downward flowing air inwardly within the lawn mower housing, so that the lateral air flow tends to lift and straighten the grass. This effectively pulls the grass into the housing through the opening in the plate and into contact with the blade to provide a more complete and even cut. The plate member also acts as a "glide plate" to reduce drag on the housing as it is moved along the ground or other support surface, thereby enhancing the stability and handling characteristics of the apparatus. Furthermore, pressurized air flowing beneath the plate member will act on the entire surface area of a relatively flat undersurface thereof to further enhance the lifting force exerted on the housing.

According to a further feature of the invention, the plate member provides a substantial advantage for reducing the chances of objects contacting the blade or rotary impeller within the housing. There is an extended plate member projecting inward from the housing so that carelessly reaching the blade from the outside is more difficult. Also, there are openings such as with a grid having spacing sufficient for grass (or debris in the case of a vacuum cleaner) to be suctioned upward into the housing for cutting, (or collection in the case of a vacuum cleaner), yet deflecting larger sized objects from entering the housing and contacting the blade. Of course care must always still be employed when operating any power machinery. Rocks and sticks or other movable objects which do enter the housing are projected outward and substantially deflected from being thrown out below the housing by the plate member around the periphery. The objects are conveyed to a collection chamber by the centrifugal actions and rotations of the blade.

In accordance with still another feature of the invention a positive/negative pressure sealant means is provided. The sealant means may be movable vertically or horizontally and may be a rigid movable mechanical means or flexible sealant means. The pressure sealant means facilitates separating the air pressure for lift or flotation from the vacuum or suction for debris removal within a single apparatus. Thus, for example, a flotation vacuum cleaner is provided with sealant means for maximum isolation of two opposing forces in a balance which provides flotation pressure and vacuum suction at the same time but at different locations beneath the apparatus.

BRIEF DESCRIPTION OF THE DRAWINGS

For a more complete understanding of the present invention and the advantages thereof, reference should be made to the following Detailed Description taken in connection with the accompanying drawings in which: mower to the present invention.

Similar reference characters refer to similar parts throughout the several views of the drawings.

DETAILED DESCRIPTION

Figure 1:
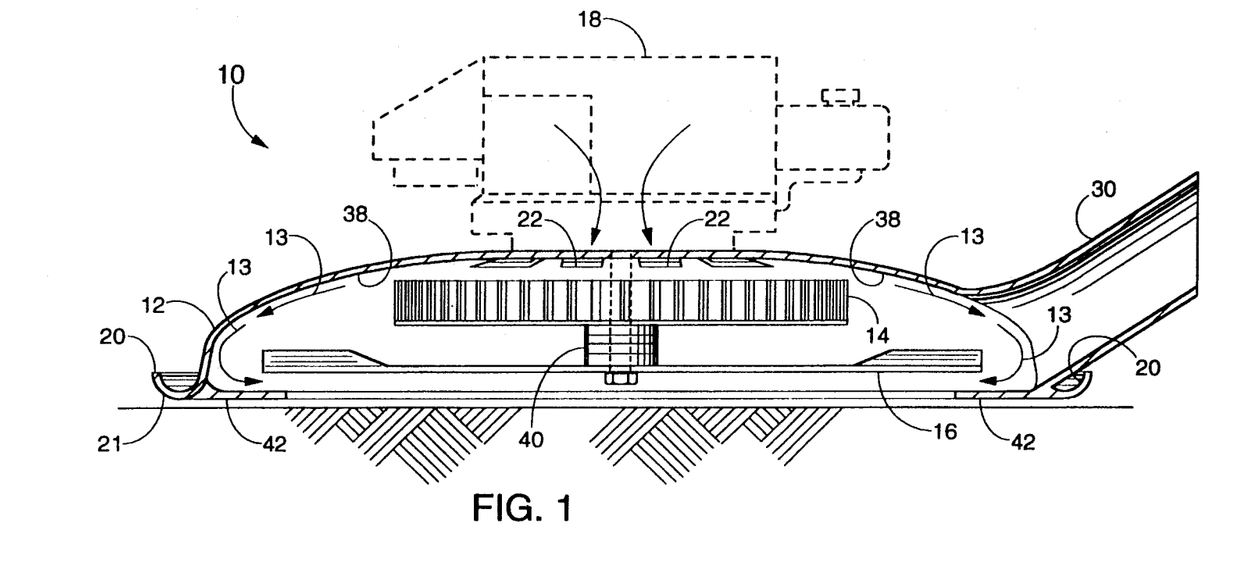
FIG. 1 is a sectional view of a bottom part of a lawn mower according to the present invention.

Referring to FIG. 1, an air-floated apparatus 10 includes an endless housing 12 in which a rotary air impeller 14 and a rotary blade 16 are mounted for common rotation by a power source. The blade 16 may be a cutting blade as shown or may be a blade for creating an up draft or localized pressure vacuum for vacuum cleaning purposes. Power source 18 is operatively mounted on top of housing 12 in a generally central location by conventional fastening means (not shown). Power source 18 can be an AC or DC electric motor or, alternatively, a conventional gasoline engine. For clarity and convenience the invention will be generally described in connection with a lawn mower. Advantages for other pressure activated apparatuses will be occasionally referred to.

In one embodiment, housing 12 is generally trapezoidal in shape and is preferably made of plastic formed by an injection molding process to provide a lightweight housing. A lip member 20 is curved upwardly and outwardly around substantially the entire bottom part of housing. The radius portion 21 in the lip member can be flattened and/or lengthened to increase the effective surface area and sealant means underlying the lip member 20, thus increasing lifting force on the housing as will be described below. Housing 12 in the embodiment shown has a plurality of air intake openings 22 located in a top part thereof and a substantially open bottom. Alternatively the air intake may be from an appropriate point within or under the housing to accomplish other functions such as vacuum cleaning, clipping distribution or other pressure related functions. A handle (not shown) is pivotally attached to respective opposite sides of housing 12 to allow a user to control movement of apparatus 10. Grass cuttings and the like are discharged from housing 12 through a rearwardly extending discharge duct 30 and may be directed as desired such as for collection in a receptacle (not shown).

Air impeller 14 is preferably comprised of lightweight plastic materials, which may be formed by injection molding. Impeller 14 is configured to draw air into housing 12 through air intake opening 22 and expel the air outwardly from impeller 14 along inner surface 38 of housing 12. The air flow within housing is depicted by arrows 13. Blade 16 is positioned below impeller 14 and blade 16 is adjustable by means of shims or spacers 40. For example, the vertical position of a cutting blade 16 within housing 12 determines the height of the resulting grass cut.

In accordance with one feature of the invention, a relatively flat plate member 42 projects inwardly from around substantially the entire bottom part of the housing 12 to define a substantially endless shelf extending around the inside of the housing 12 and define the open bottom of housing 12. Plate member 42 can be integrally formed on the bottom part of housing 12, or, alternatively, plate member 42 can be attached to the bottom of the housing 12 by screws or other suitable attachment devices. Plate member 42 directs at least some of the air flowing downwardly along inner surface 38 of housing 12 substantially laterally, as shown by the inwardly directed arrows 13 at the bottom part of housing 12, thereby substantially reducing air leakage from housing 12, beneath lip member 20. By retaining more air within housing 12, the air pressure within housing 12 is increased for a given impeller and impeller speed to enhance the lifting force acting on housing 12. Reducing air leakage from housing 12 also reduces the amount of dust and debris blown up by the air escaping from beneath lip member 20, particularly when mowing around shrubbery and the like. Further, the collection action can be used to enhance collection of grass clippings and debris through a safe outlet and into a receptacle. In operation, housing 12, including impeller 14 and blade 16, rides on a cushion of air which substantially facilitates the movement and handling of lawn mower 10. The plate member also increases the distance between the outer housing and the rotating blade thereby reducing the chances of inadvertent contact by the operator. Further, the plate member and its collection capabilities facilitates redirecting grass clippings for recutting or mulching.

In addition to reducing air leakage from housing 12, plate member 42 provides shelf support for grass cuttings, which are thrown against inner surface 38 of housing 12 by the centrifugal action of rotating blade 16. Plate member 42 cooperates with inner surface 38 of housing 12 to channel the centrifuged grass cuttings into discharge duct 30, thereby substantially enhancing the grass catching capability of lawn mower 10. The discharged clippings can be directed into a receptacle for collection. Alternatively, the centrifuged clippings may be directed back into the housing and blade for recutting, mulching, and/or recycling thereof.

It should also be appreciated that plate member 42 can also be used on non-air-floated mowers to enhance the capabilities such as the grass catching capability, or the mulching capabilities or the inaccessibility of the blade from contact. As will be described below, such non-air-floated mowers may still advantageously include an impeller for creation of air flow and pressure gradients to facilitate the collection or the distribution of the cut grass clippings to the mowed area and into the soil surface.

The relatively high air pressure within housing 12 is sufficient to pneumatically discharge grass cuttings through a relatively small discharge duct 30, such as a discharge duct having a diameter of approximately three inches. The capability of discharging substantial amounts of grass cuttings at high pressures through a relatively narrow discharge duct is a significant advantage over prior art air-floated lawn mowers, which cannot effectively discharge grass cuttings because of the problem of air leakage around the periphery of housing 12. Furthermore, the lateral air flow provided by plate member 42 tends to lift and straighten the grass as it is being cut to provide a more complete and a more even cut.

Plate member 42 cooperates with housing 12 to provide several other advantages. The relatively flat undersurface of plate member 42 acts as a glide plate to reduce the drag on housing 12 as it is moved across the lawn and prevents the bottom edge of housing 12 from sinking too deeply into the grass, which can cause the blade to scalp the grass below the desired cutting height, particularly when the mower is started. Furthermore, the undersurface of plate member 42 also provides a lifting surface, which is acted upon by air pressure between the undersurface of plate member 42 and the ground, thereby enhancing the lifting action on housing 12. Plate member 42 also stabilizes housing 12 against tilting from side to side, and enhances the maneuverability and handling characteristics of the lawn mower.

Plate member 42 can be configured to provide a curved surface on either or both of the top and bottom surfaces as an alternative to the substantially flat plate described above. The inward extension of plate 42 makes it more difficult to contact cutting blade 16 during operation of mower 10 because an object, such a user's foot, must be extended farther laterally into housing 12 before it can be moved upward into contact with the rotating cutting blade. As shown in FIG. 1, blade 16 is positioned above plate 42. Of course strong warnings and proper instructions against purposeful attempts to contact the interior of the housing and against carelessness are recommended. Proper care in operation and maintenance must always be exercised by the operator of power equipment.

Figure 2:
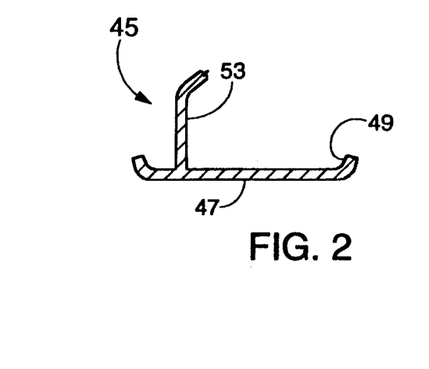
FIG. 2 is a sectional view of a bottom part of a lawn mower housing according to the invention.

Referring to FIG. 2, an alternate embodiment of a housing 45 for an air-floated lawn mower is depicted. Plate member 37 is integrally formed as a bottom part of housing 45 and projects into housing 45 in substantially the same manner as plate member 42, described above. Plate member 47 has a relatively flat or slightly curved surface terminating in an upwardly curved lip 49 inside housing 45. Housing 45 may also have an external peripheral lip member as described above with reference to housing 12. Inner lip 49 enhances the channeling effect of plate member 47 by trapping more of the grass cuttings between inner wall 53 of housing 45 and lip 49.

Figure 3:
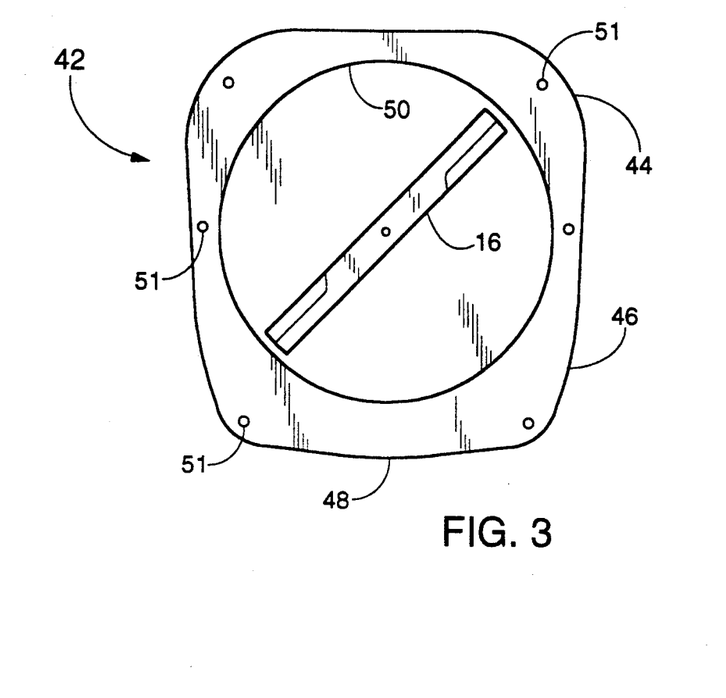
FIG. 3 is a bottom plan view of the housing portion of the air-floated lawn mower of FIG. 1.

Referring to FIG. 3, plate member 42 is substantially trapezoidal in shape to conform to a substantially trapezoidal-shaped housing, such that front position 44 of plate member 42 is slightly narrower than rear portion 46 thereof. Rear portion 46 has a sloped surface 48 extending rearwardly and upwardly from the remainder of rear portion 46 at an angle of approximately five degrees. Plate member 42 has a substantially annular shape with centrally disposed circular opening 50 for defining a 360° bottom opening of the corresponding housing. In the embodiment illustrated, the diameter of opening 50 is slightly larger than the cutting range of blade 16. Plate member 42 has a plurality of openings 51 for receiving threaded screws or the like to attach the plate member 42 to the corresponding mower housing.

Figure 4:
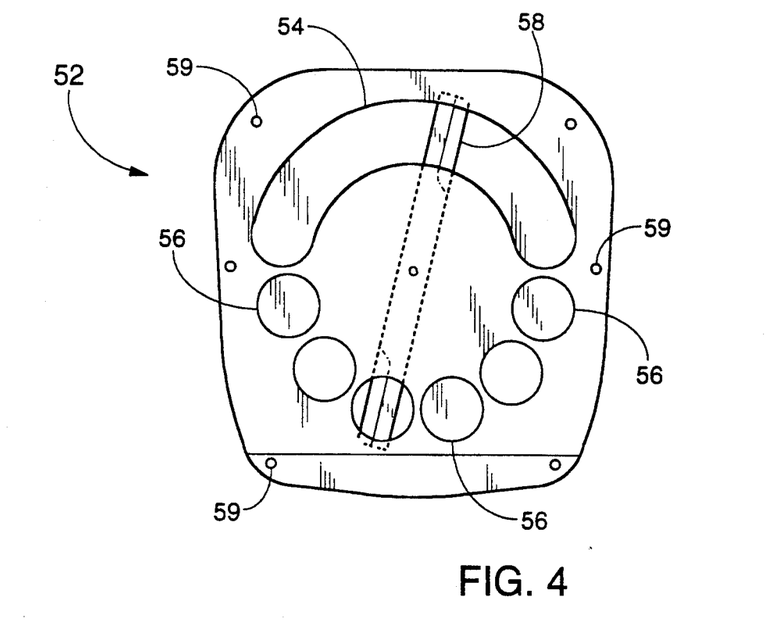
FIG. 4 is a bottom plan view of the housing portion of a first alternate embodiment of an air-floated lawn mower.

Referring to FIG. 4, plate member 52 is similar to plate member 42, illustrated in FIG. 3, as described above, except for the plate openings. An arcuate slot 54 extends along an arc of approximately 180° in a first portion of plate member 52 and a plurality of circular openings 56, the respective centers of which lie along an arc of approximately 180°, are located in a second predetermined portion of plate member 52. Plate member 52 thus creates a "semi-closed pressure chamber." In this embodiment cutting blade 58 extends beyond slot 54 in the first portion of plate member 52 and beyond circular openings 56 in the second portion of plate member 52, such that the cutting range of blade 58 is greater than the extent of slot 54 and openings 56. The reduced opening area further makes it more difficult for an operator's carelessness to result in contact with cutting blade 16 during operation.

Mounting holes 59 are formed in plate member 52 for mounting the plate member 52 on a bottom portion of a mower housing. Alternatively, plate member 52 can be integrally formed on the corresponding mower housing.

Figure 5:
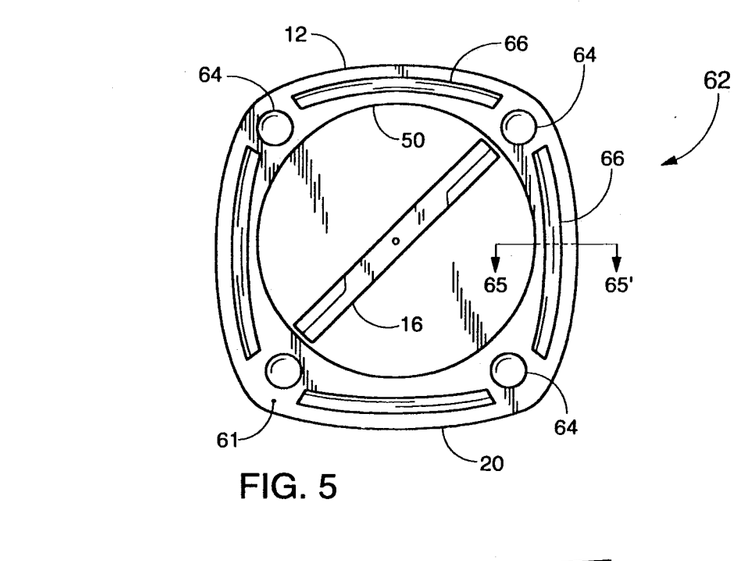
FIG. 5 is a bottom plan view of the housing portion of a second alternate embodiment of an air-floated lawn mower.
Figure 5A:
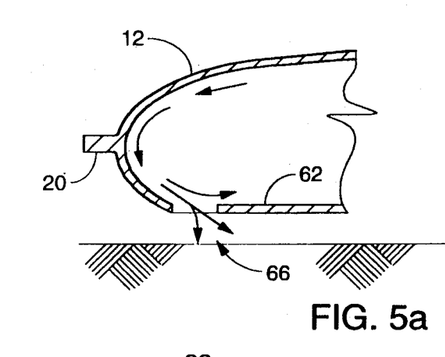
FIG. 5A is a sectional view of a portion of the housing shown in FIG. 5.

FIG. 5 shows an alternate embodiment wherein plate member 62 has preferably four (4) air ports 64 symmetrically located at the corners thereof. Air ports 64 may be circular, oval-shaped, elliptical, or any other convenient shape. The plate member 62 includes an arcuate air slot 66 located between each pair of air ports 64. As seen in FIG. 5A, which is a sectional view taken along section line 65—65 of FIG. 5, a portion of the pressurized air within the housing is directed through the air slot 66 to facilitate the formation of a semi-ground effect cushion underlying the plate member 62 and the outer deck or lip 20 of housing 12. The slots 66 create an air flow in and through the area of the plate member 62 adjacent thereto to provide maximum yet stable lift. The air directed laterally inward helps pressurize the housing, the air directed at a steep angle to the vertical also helps to stand up or underlift the grass being cut. Another portion of the pressurized air is forced downward and out of the air ports 64 to lift the housing upwards and away from the support surface.

Figure 5B:
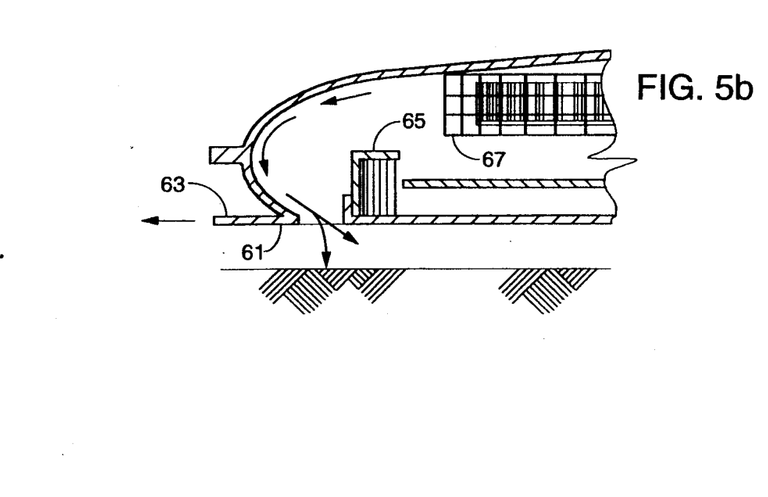
FIG. 5B is an alternative construction of the housing shown in FIG. 5A.

FIG. 5B shows a partial cutaway cross sectional view of an alternative construction of FIG. 5A wherein the plate member 61 includes an outer deck 63. The plate member 61 supports a centrifuge module 65 for conveying the cut grass clippings to a discharge port. The impeller is supported in a safety grid 67 that shields the impeller from rocks or other debris, so that damage is reduced and durability of the apparatus is enhanced.

Figure 6:
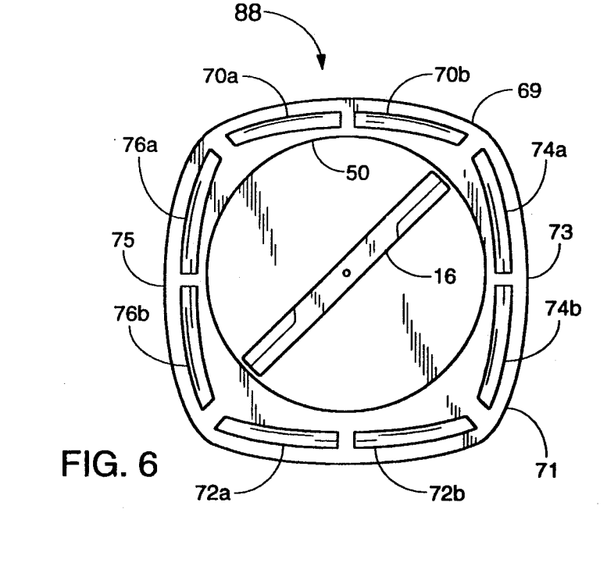
FIG. 6 is a bottom plan view of the housing portion of a third alternate embodiment of an air-floated lawn mower.

FIG. 6 shows yet another alternate embodiment wherein the plate member includes a pair of air slots along each of its front, rear and sides. Air slots 70a and 70b are formed in the front 69, air slots 72a and 72b are formed in the rear, air slots 74a and 74b are formed in the side 73, and air slots 76a and 76b are formed in the side 75. These slots provide air flow horizontally and at a substantial angle from vertical inward. A component of the air flow is also downward.

Figures 7, 8, 9:
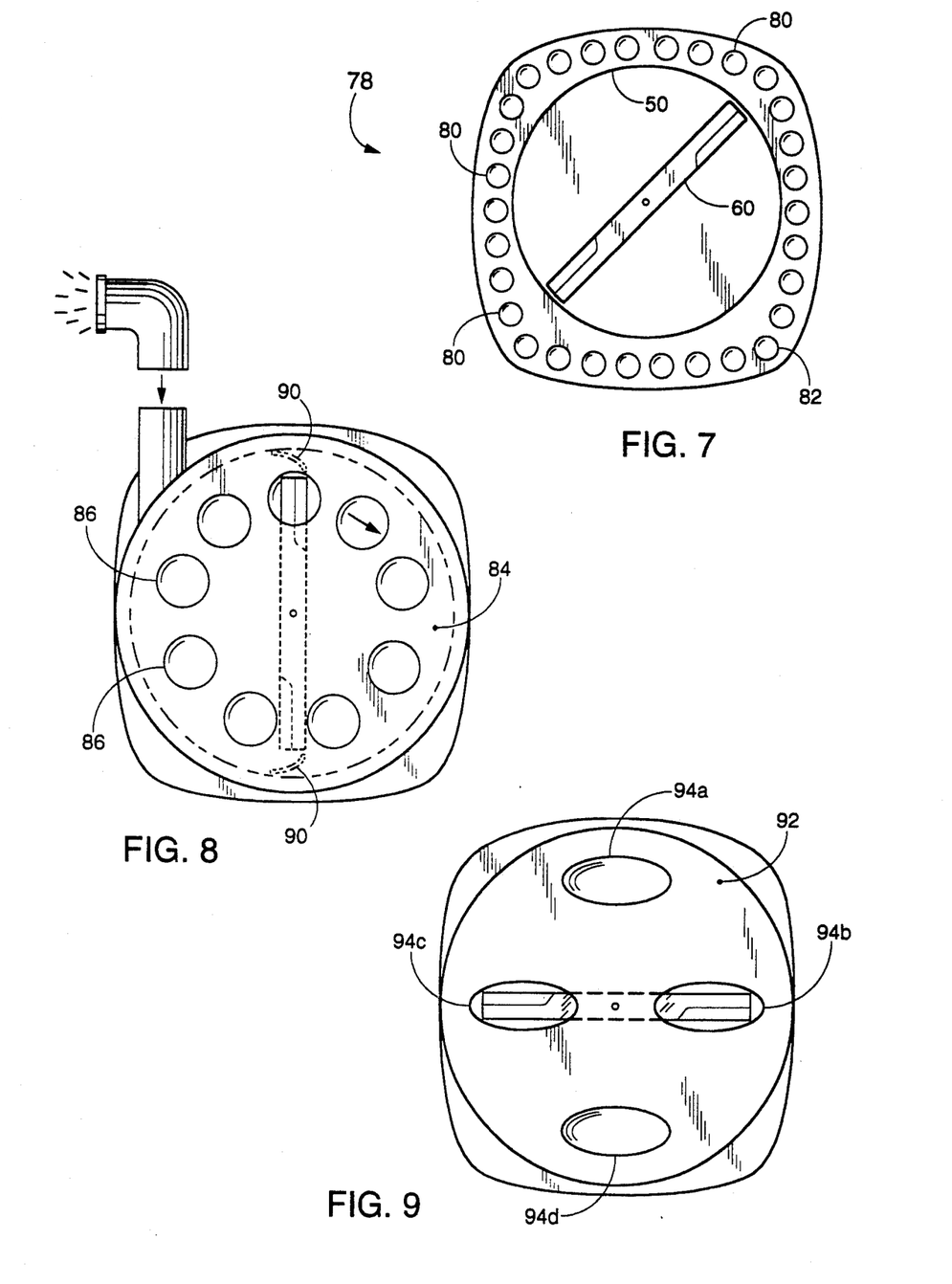
FIG. 7 is a bottom plan view of the housing portion of a fourth alternate embodiment of an air-floated lawn mower.
FIG. 8 is a bottom plan view of yet a fifth alternate embodiment of the plate member.
FIG. 9 is a bottom plan view of a sixth alternate embodiment of the plate member.

FIG. 7 shows still another alternate embodiment wherein the plate member 78 includes a plurality of smaller-diameter air ports 80 spaced in plate member 78 substantially around the entire periphery. This arrangement provides, in combination with other features of the plate member as described above, air flow through numerous ports which is directed substantially inward and partially downward and is especially useful when additional lift is deemed advantageous.

FIGS. 8-9 show in bottom plan views two additional alternate "semi-closed" embodiments of the plate member that are particularly useful in enhancing the safe operation of the apparatus or mower. In FIG. 8, the plate member 84 is substantially intact except for a plurality of circular openings 86, the respective centers of which lie along a circle of substantially 360°. The circle is located within the cutting range of blade 88. In this embodiment, one or more arcuate diverter plates 90 are selectively located within the housing on the upper facing side of the plate member 84 (and thus are shown in phantom). Mulch diverter plates 90 facilitate the channeling of cut grass clippings back into the path of the cutting blade 88 to thereby effect a recycle and recut of such clippings. Air pressure forces and distributes fine cut clippings to the soil area for composting and mulching.

FIG. 9 shows yet another embodiment wherein the plate member 92 is substantially intact except for a plurality of oval-shaped openings 94a-94d which lie within the cutting range of blade 96.

Figure 10:
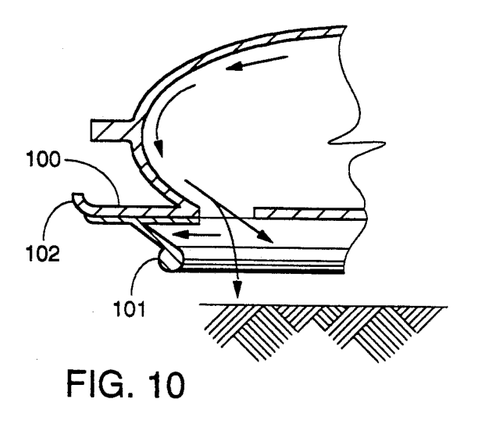
FIGS. 10-12 show additional modifications of the plate member for reducing air leakage from the housing.
Figure 11:
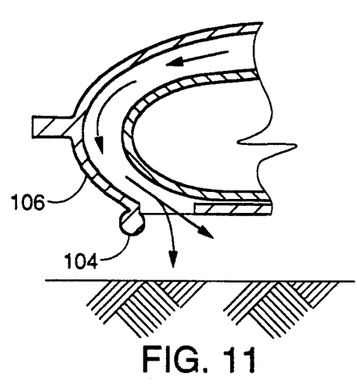
Figure 12:
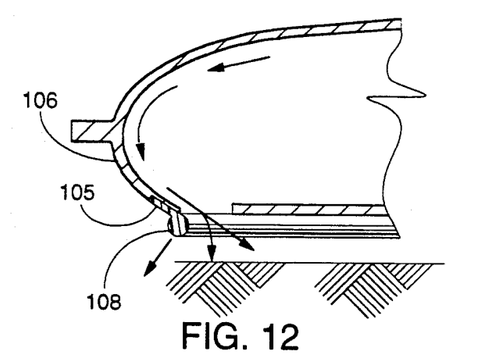
Figure 12A:
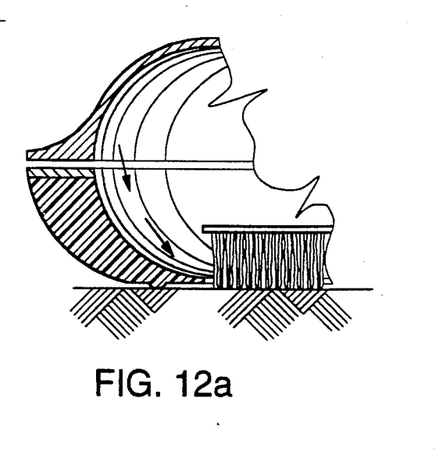
FIGS. 12A, 12B, 12C, 12D, 12E, 12F, and 12G show additional modifications of the plate member for reducing air leakage from the housing.

Referring to FIGS. 10-12, additional modifications to the plate member are shown for facilitating air flow and pressure distribution within the apparatus housing and preventing pressurized air from escaping from the housing. In FIG. 10, the housing includes the outer deck 100 having an upwardly curved lip 102. The width of the outer deck 100 is sized appropriately to reduce the amount of air leakage. The sealing effect of the deck 100 can also be enhanced with a pressure seal 101 (shown in one embodiment in cross section) affixed around the bottom perimeter of the outer deck 100. Alternatively, and as shown in FIG. 11, a boss 104 is molded with or otherwise affixed to the inwardly curved lower portion 106 of the housing. Yet another approach is shown in FIG. 12 wherein a flexible rubber seal 105 is retained in a slot of the lower portion 106 of the housing. Seal 105 includes a rounded distal end 108 that is forced downward against the support surface to substantially seal against the escape of the pressurized air within the housing. Such a construction promotes the smooth gliding action of the mower.

Figure 12B:
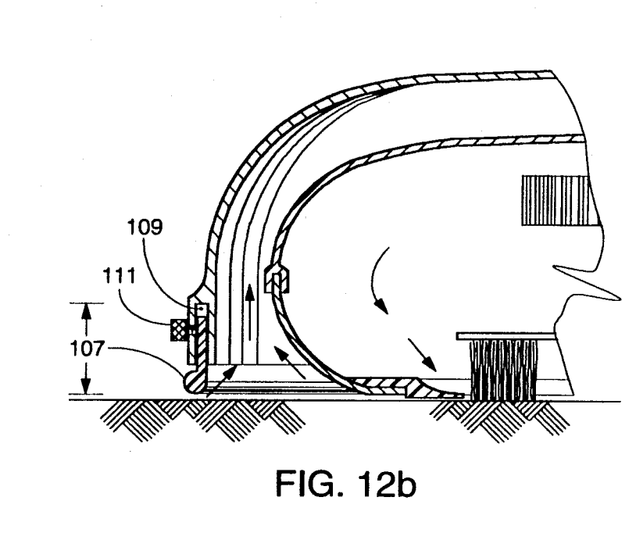
Figure 12C:
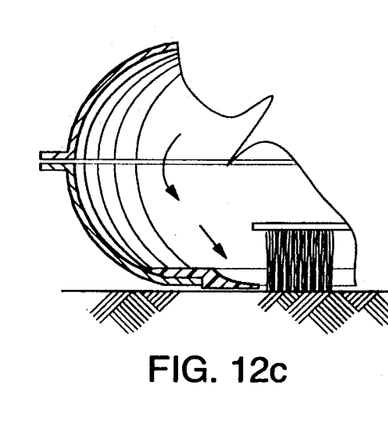

FIGS. 12A, 12B, 12C, 12D and 12E show additional embodiments of a sealant means for a minimum escape of air pressure on a surface area such as grass or carpet. FIG. 12B also shows a vertical adjustment module 107 which may be adjustably raised or lowered within channel 109 and held in a selected vertical position with fastener 111 such as a knurled friction creating screw. This permits adjustment of the air intake and thus the vacuum force. Optimized vacuum force also draws down the sealant means for facilitating sealing on the pressure side.

Figure 12D:
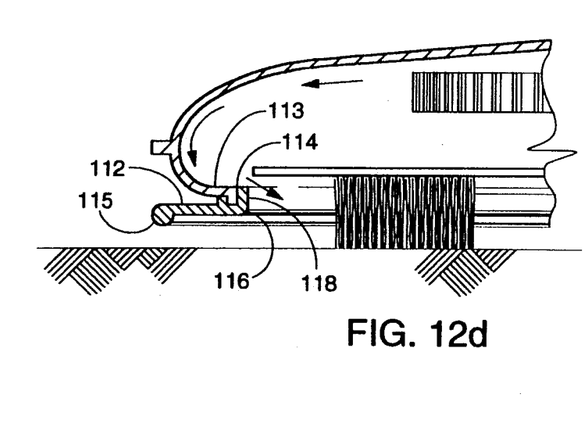
Figure 12E:
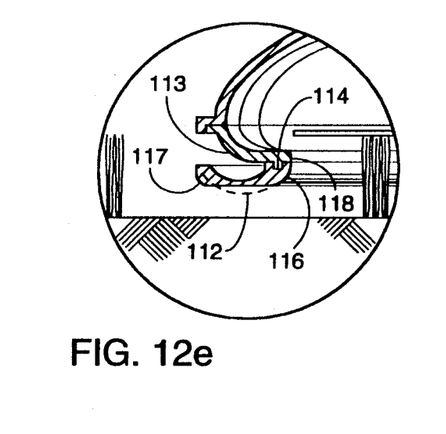

FIG. 12D and 12E show a means for advantageously fastening an outwardly projecting plate portion 112 below the inwardly projecting shelf 113 of the glide plate member. The downward vertical wall 118 spacing and outward projection provides additional sealing means and further provides additional safety shielding effect so that the internal rotating blade is further separated from the exterior of the apparatus. A connection can be made through a male and female interconnecting projection 114 which may be fastened as by sonic welding in plastic molded construction. Smooth gliding and sealing is further facilitated as by rounded boss 115 in FIG. 12D and rounded corners 116 and 117 in FIG. 12E.

Figures 12F, 12G, 13:
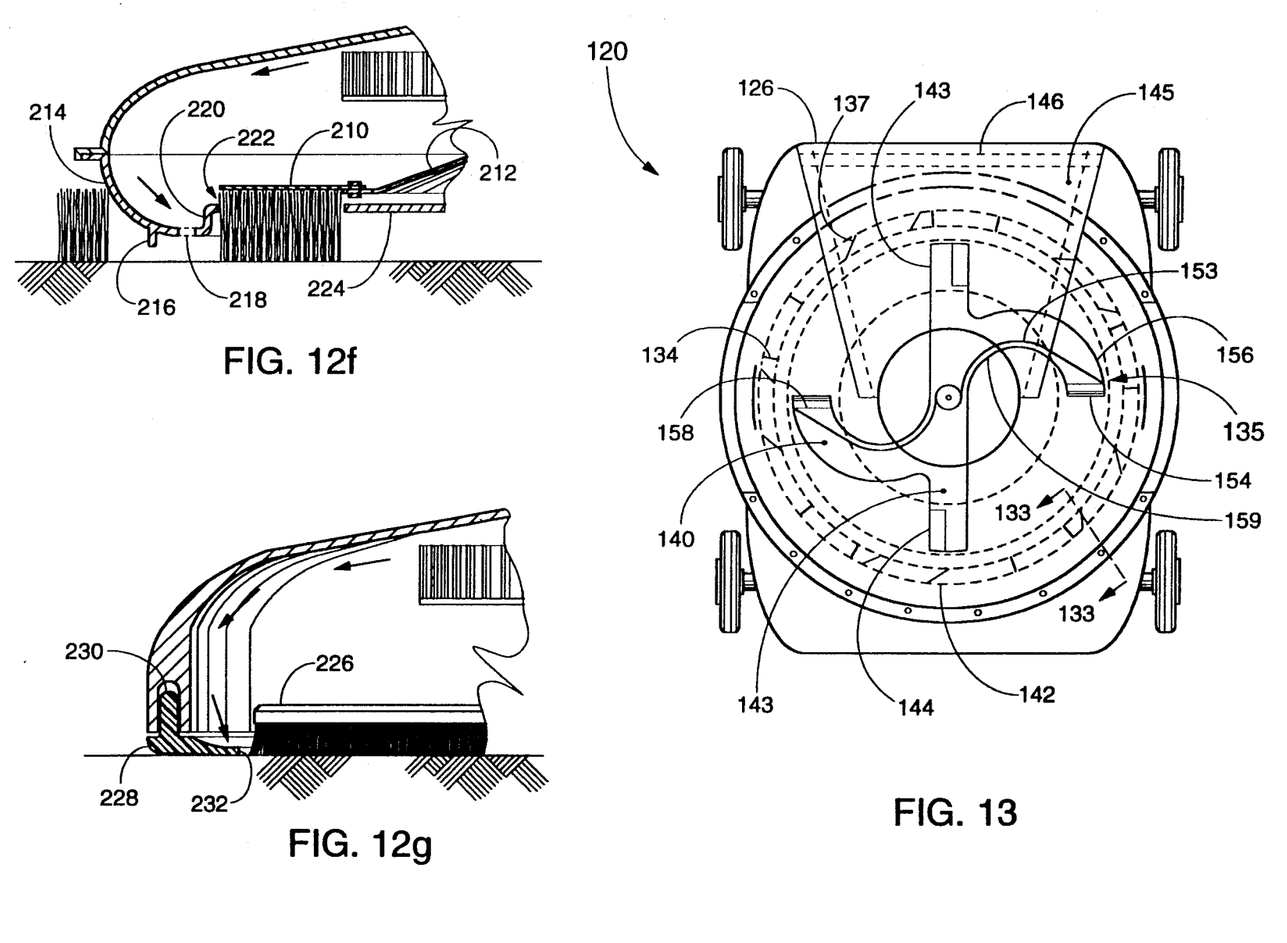
FIG. 13 shows a plan of an improved wheeled lawn mower according to the teachings of this invention which includes a centrifuge raceway and a novel mulching blade.

FIGS. 12F and 12G show additional embodiments in which features of the invention may provide advantages. FIG. 12F shows a bladed lawn mower with pivoted blades 210 on an inverted cone shaped rotating blade disk 212. The inward lower rim portion 214 has a molded projection 216 therearound and forms one or more openings 218 adjacent an upwardly projecting structural rim portion 220. Inward from the structural rim portion 220, one or more grass inlet openings 222 are formed in plate member 224.

FIG. 12G shows an air floated apparatus for rotary mopping or floor polishing. The rotary mop 226 operates in a pressurized housing which is sealed using a movable plate and seal member 228. The movable plate and seal 228 moves vertically relative to the housing as in channel 230. The internal pressure holds the seal lip 232 downward on the smooth floor effectively helping both the pressure and the cleaning or polishing fluid inside the housing.

As noted above, the plate member provides many of the same useful advantages when incorporated into a wheeled mower. In particular, the use of the plate member enables the mower housing to be effectively sealed on its outside edges, thus substantially reducing the chances that the operator can be injured. Also, the plate member facilitates the centrifuging of cut grass clippings (as well as any objects such as rocks) to the discharge duct. According to the present invention, any of the plate member configurations described herein may be used in a wheeled mower. The glide plate members are particularly advantageous where pressure distribution within the housing facilitates the lifting of grass upward into the openings in the glide plate for uniform cutting. For example, without adequate pressure gradient assisted lifting of the grass plates with openings or shielding grids across the bottom of a mower would block portions of the grass from contacting the cutting blade and would not completely and evenly cut the grass. Also mulch diverter modules can be affixed to the topside or inward shelf of the plate. This advantageously allows the centrifuged grass clippings to be diverted back into the tip speed of the cutting blade for recycling and recut of fine grass clippings for mulch.

With reference now to FIG. 13, a plan view of one example of such a wheeled mower 120 is shown. Mower 120 includes a housing 122 having a front 124 and a back 126. Wheels 128 are supported on axles 130 in a conventional manner. A plate member 132 extends from the bottom edge of the housing 122 and includes a plurality of air diverter slots 134 for the reasons to be described below. Slots 134 are positioned in a circular orientation outside the cutting range of cutting blade 135.

Figure 14:
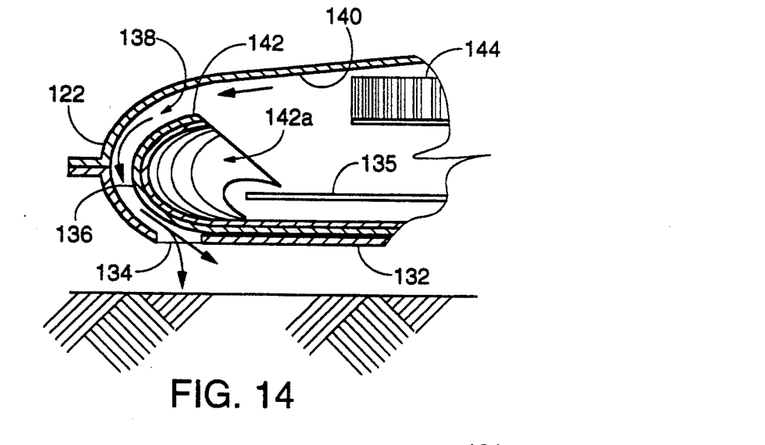
FIG. 14 is a cross-sectional view of a portion of the lawn mower of FIG. 13.

Referring now simultaneously to FIG. 13 which is a top plan view of a mower and FIG. 14 which is a partial cutaway cross sectional view at section line 133-133, the plate member 132 preferably supports a plurality of arcuate diverter modules 136 that facilitate the mulching of cut grass clippings. Alternatively, a full recovery of clippings can be facilitated by centrifuging the clippings to a discharge port (not shown). Each diverter module 136 preferably has a rounded profile (as viewed in cross-section such as in FIG. 14) and includes a leading arcuate edge 137. Referring to FIG. 14, an air channel 138 is formed between the inner wall 140 of the housing 122 and the outer wall 142 of the diverter 136.

This channel is advantageously used to direct pressurized air, generated by an impeller, in and through the diverter slots 134. Impeller 144 has a vacuum side in part connected through shroud 145 (FIG. 13) to a vacuum slot 146 located along the back 126 of the housing. Clippings generated by the action of the cutting blade 135 are thrown into the ground. As the mower advances in the forward direction, the vacuum slot 146 suction force is used as a swath cleanup for the top surface area. In particular, clippings are vacuumed into shroud 145, delivered through to the pressure side of the impeller 144, forced downward and recycled through the channel 138 and the slots 134, and delivered back into the ground. The recycled clippings can then be recut by the cutting blade 135.

The mower shown in FIG. 13 thus provides a mulching operation through the user of an air impeller having a vacuum side connected to a vacuum slot for suctioning cut clippings for recycling through the machine and then recutting. This mulching operation is facilitated by the diverter modules 136 attached to the plate member 132, by the slots 134 in the plate member 132, as well as through the use of a novel mulching cutting blade 135. Blade 135 includes a pair of semi-circular cutting arms 140, each of which extends from one of a pair of straight cutting members 143. Each of the straight cutting members 143 includes a cutting tip 144 which cuts the grass and throws the resulting clippings outwardly for centrifuging. Each semi-circular cutting arm 140, however, provides a mulching operation by virtue of its unique construction.

In particular, cutting arms 140 together form a generally serpentine-shape. Each arm 140 includes a forward preferably replaceable or even "snap-on" cutting tip 154 at its distal end 156. When the tip is dulled through use, it is removed and replaced with a new tip that is securely snapped onto the distal end of the arm 142. Each arm further includes a diverter 158 adjacent the cutting tip 154 that functions to collect and move the cuttings inwardly forwards the center 159 of the blade. In particular, clippings cut by the tip 154 are forced and conveyed inwardly and downwardly along an upwardly-turned lip 153 along the frontal portion of the arm 142, thus creating a mass of clippings (at or adjacent the center 159) that is continually distributed and repeatedly recut as the blade rotates and the mower is advanced in a forward direction. Thus as the blade rotates, some portion of the clippings are conveyed inwardly by arms 140 and distributed into the soil area. Clippings generated by the straight cutting members 143 are thrown outwards, trapped, and centrifuged for recycle by the diverters 136. As noted above, as the mower advances, some of the clippings are vacuumed, recycled through the housing and then recut as previously described.

Figure 15:
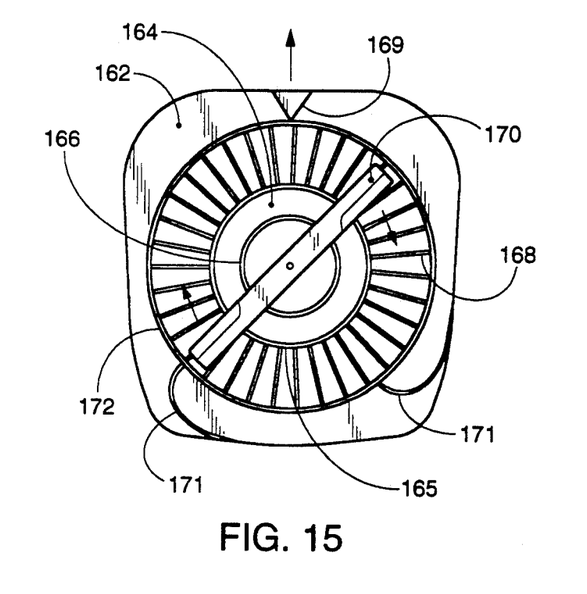
FIG. 15 is yet another alternate embodiment of an air-floated lawn mower having a plate member with enhanced safety means.
Figure 16:
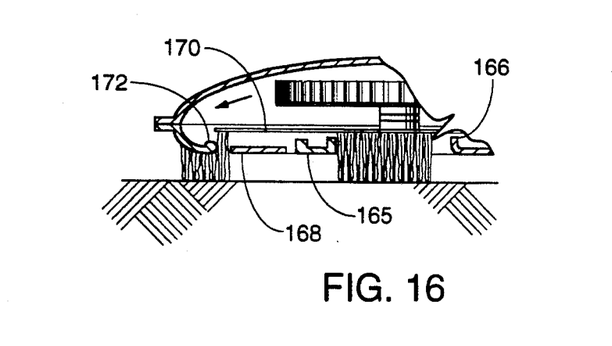
FIG. 16 is a partially cutaway view of the lawn mower of FIG. 15.
Figure 17A:
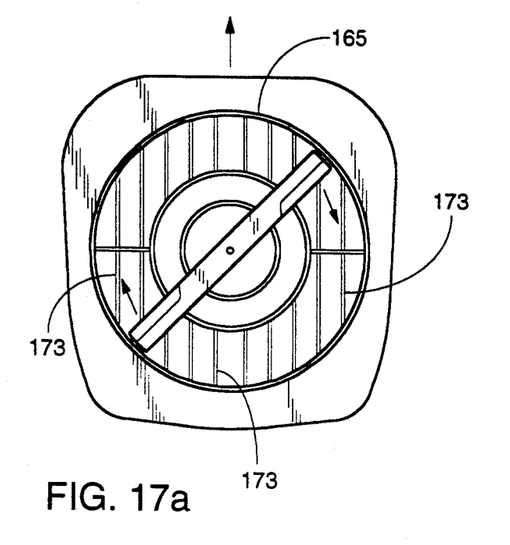
FIGS. 17A, 17B, 17C and 17D are yet other alternate embodiments of an air-floated lawn mower having a plate member with enhanced safety means.

Yet another alternative embodiment of the plate member is shown in FIGS. 15-16. In this embodiment, plate member 162 includes a substantially circular portion 164 having an inner structural rib 166 and an outer structural rib 165. Inner rib 166 promotes a smooth glide-like mowing action. The circular portion 164 is attached to the remainder of the plate member 162 through a plurality of radially-positioned grid fins 168, preferably spaced at predetermined arcuate intervals. The grass projects up between the spaced fins by a relative low pressure within the housing adjacent a cutting portion of the blade 170 and is cut by blade 170. The inner edge of the plate member also includes a structural rib 172. This plate advantageously provides a substantially shielded configuration for the blade to thus enhance safety while providing appropriate pressure differentials and air flow within the housing to suction the grass into the housing for cutting. While it is particularly advantageous for air floated apparatus, it will also provide the safety advantage for wheeled lawn mowers. FIGS. 15 and 17A also show mulching diverters which can be added if desired for mulching or for centrifuging grass to and through a grass delivery port to a grass catcher.

Figure 17B:
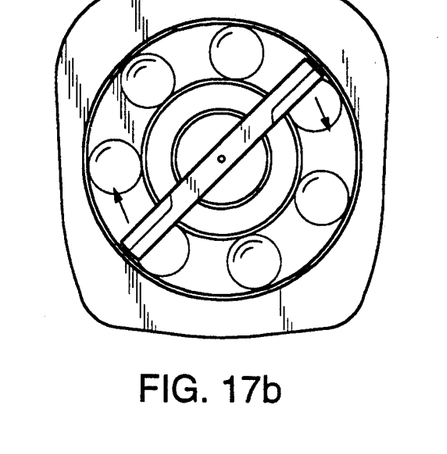
Figure 17C:
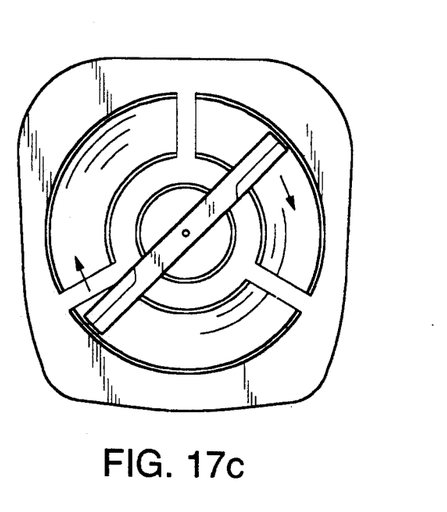
Figure 17D:
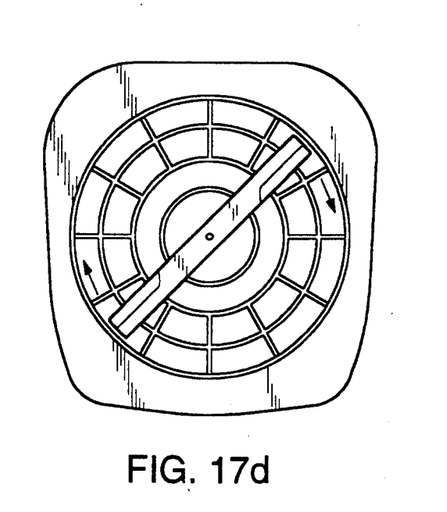

FIGS. 17A, 17B, 17C and 17D show alternative shield grid configurations in which the grid 173 is arranged in various constructions. Particularly grid 173 in FIG. 17A are oriented substantially parallel to a single direction of motion. In this case from front to back. FIG. 17B has a plurality of circular openings. FIGS. 17C and 17D are alternate radially oriented grid constructions.

The plate arrangements shown in FIGS. 15-17 can be further advantageously constructed with mulching diverters 169 and/or 171 on the interior upper shelf of plate 162. Mulching diverter 169 is shown as a triangular or wedge shaped projection. Mulching diverters 171 are shown as curved channels or chutes. Other diverter configurations could also be easily affixed to plate 162.

Figure 18:
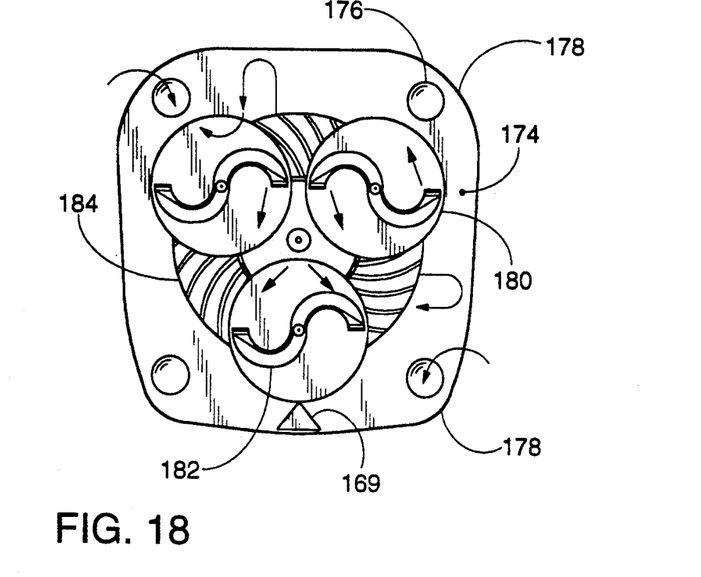
FIG. 18 is yet another embodiment of the invention showing a plate member incorporating into a multi-blade air-floated apparatus.
Figure 19:
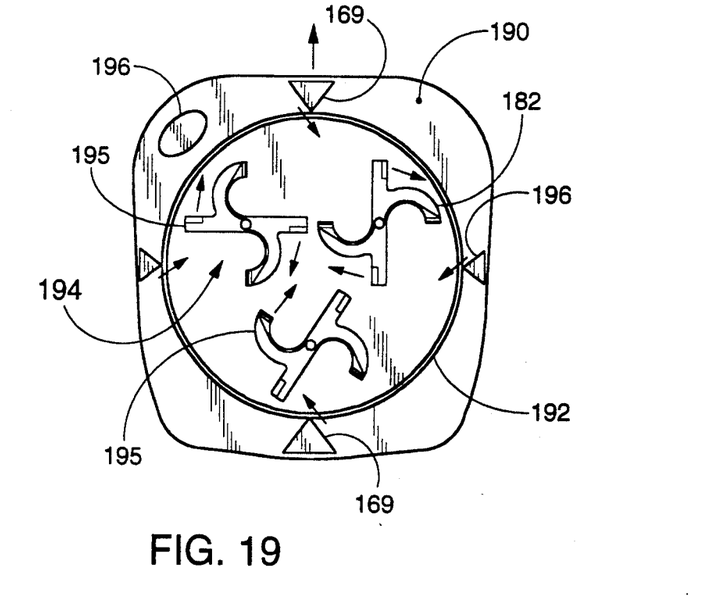
FIG. 19 is another embodiment of a multi-blade air-floated apparatus.

FIGS. 18-19 show still other embodiments of the invention wherein a plate member is incorporated into an air-floated apparatus having a plurality of blades. This plurality of blades is particularly advantageous for mulching. Thus a multiple cutting blade system in combination with the mulch diverters promotes a mixing and mulching aspect. The air pressure facilitates distributing the clippings to the soil area. In FIG. 18, see divert for example, the plate member 174 includes the plurality of air ports 176 located adjacent the corners 178 of the housing. Three circular openings 180 are provided in the housing. Within each opening 180 is a preferably serpentine or S-shaped mulching blade 182 formed by a pair of semi-circular cutting arms. An impeller provides the lifting force. Each of the blades 182 preferably is driven by a V-belt/pulley mechanism driven by the main drive shaft used to drive the impeller.

In FIG. 19, the plate member 190 includes a single central opening 192 instead of the three (3) separate openings shown in FIG. 18. Each of the blades 194 is a combined mulching/centrifuge blade of the type described above with respect to FIG. 13. Plate member 190 includes one or more diverters 196 located on an upper portion thereof (i.e., within the housing). Thus, clippings thrown outwards by the straight cutting members 195 are centrifuged on the plate and then re-diverted back into the path(s) of the blades for recycle and recut. Apertures 196 in the plate member 190 provide enhanced lift and air flow control as previously described.

Figure 20:
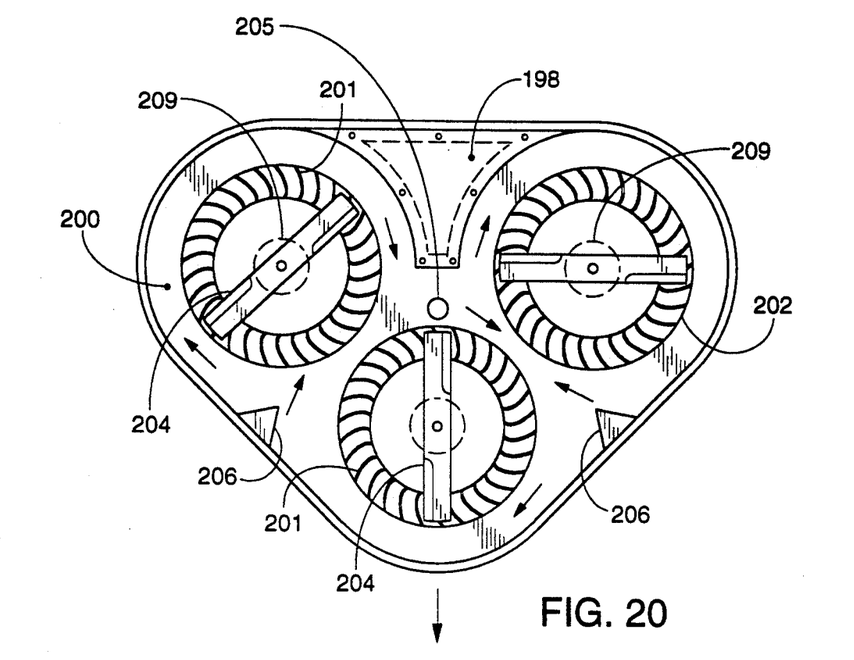
FIG. 20 is still another embodiment of a multi-blade air-floated apparatus according to the invention.

Other multi-blade/multiple-impeller machines, such as machines for commercial applications and uses, are within the scope of the invention as well. For example, the apparatus may include two blades, or each of the multiple blades can be a standard straight blade. If the housing itself is triangular-shaped, additional diverter structures can be incorporated for further control of the centrifuging and/or mulching. One such alternative configuration is shown in FIG. 20 wherein a dual diverter module 198 is affixed to the upper side of plate member 200. Plate member 200 includes three openings 202. The blades 204 are conventional straight cutting members. An air impeller 201 is supported coaxially with each blade 204. The blades 204 and impellers 201 may be driven by belt, gear or other power transmission means. Alternatively separate motors 209 may be used at each station, such as electric DC motors with auxiliary gasoline generator power (not shown). Additional diverters 206 are supported between the blades on plate member 200. This configuration advantageously provides a mixing and mulching capability.

Figure 21:
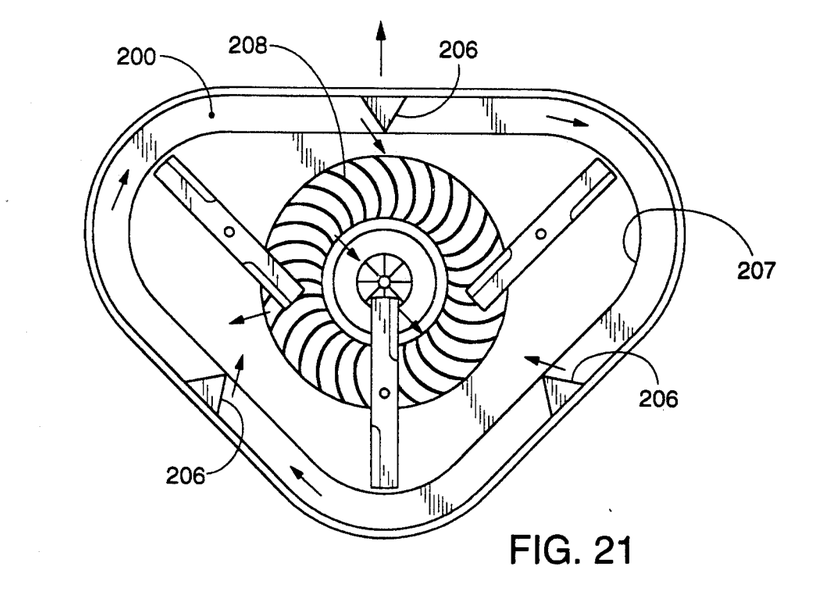
FIG. 21 is another embodiment of a multiple blade air-floated apparatus according to the invention.

Alternatively, in the embodiment as shown in FIG. 21, centrifugal plate member 200 may have a single large opening 207 instead of the three openings 202 of FIG. 20. A single impeller 208 is shown centrally located in the triangular shaped hosing. Additional diverters 206 are spaced around plate member 200 for recycle mixing and mulching. Preferably, diverters 206 are triangularly shaped and spaced beneath the blades.

The specific teachings of the present invention should not be taken to limit the scope of the appended claims. For example, according to the invention, it is within the scope of the invention to substitute another source of air pressurization such as a source of compressed air or tilted blade fan in place of the impeller. The actual size and placement of the plate member apertures may be varied for further control of the pressurized and compressed air. The cutting blade may be a filament type blade. Enhanced safety can be provided by affixing a mesh grid (with about 2"×2" openings) in the opening 50 formed by the plate member 42 in FIG. 2 or in other open bottom plate members.

The present invention has numerous advantages. The plate member in combination with the various diverter modules enables clippings to be recycled and recut to create a fine mulch. The plate member may be molded to the shape of a wheeled lawn mower bottom edge or be snapped thereon to promote and allow maximum mulching effects. The plate member may be attached to wheeled lawn mowers in combination with pressurization impellers to enhance safety while continuing to draw grass upward through the grid for proper cutting.

While the invention has been described in connection with preferred embodiments, it is not intended to limit the scope of the invention to the particular forms set forth, but on the contrary, it is intended to cover such alternatives, modifications, and equivalents as may be included within the spirit and scope of the invention as defined by the appended claims.

What is claimed is:

1. An air-pressure activated apparatus, comprising:
  a substantially endless housing having an open bottom, said housing being adapted to cooperate with a support surface beneath said housing to define a substantially enclosed chamber;
  means projecting from a bottom part of said housing laterally into said chamber, said projecting means extending from said bottom part of said housing around substantially the entire perimeter of said housing;
  means located in the chamber for establishing a differential air pressure distribution within the housing; and
  said projecting means including a relatively flat plate member having at least one aperture located in the plate member.

2. The air-pressure activated apparatus as described in claim 1, wherein the projecting means further includes a means cooperating with said plate for preventing air escaping from the housing.

3. The air pressure activated apparatus as in claim 2 wherein the means for preventing air escaping from the housing includes a boss underlying the plate member.

4. The air-pressure activated apparatus as described in claim 2, wherein the preventing means includes a movable seal supported adjacent the outward peripheral edge of the slot.

5. The air pressure activated apparatus as in claim 2 wherein said spaced apart apertures comprise a circular opening having a grid thereacross defining small openings therethrough.

6. The apparatus as described in claim 1, wherein the housing includes wheels to support the apparatus on a support surface.

7. The air pressure activated apparatus as in claim 1 further comprising a rotary mop projecting downward through said at least one aperture.

8. The air pressure activated apparatus as in claim 1 further comprising a rotary floor polisher projecting downward through said at least one aperture.

9. An air pressure activated apparatus comprising an endless housing having a bottom edge, means in the housing for increasing the pressure therein, and one or more openings in a bottom plate extending substantially entirely around the periphery of the bottom of the housing; and
  a downward rim member for increasing the sealing of pressure around the periphery of the bottom of the housing.

10. An air pressure apparatus as in claim 9 wherein the downward rim member is a flexible partially inturned member.

11. An air pressure apparatus as in claim 9 wherein the downward rim member is a mechanically slidable rigid module which is adjustably positionable so that a desired gap is provided therebelow.

12. An air pressure apparatus as in claim 11 wherein the adjustably positionable rigid module is positionable with a gap in the range of up to about ½ inch (about 1.5 cm).

13. An air-pressure apparatus as in claim 9 wherein the rim member comprises a horizontal plate spaced below and outwardly projecting from the periphery of the bottom opening of the housing.

14. An air-pressure apparatus as in claim 13 wherein a portion of the rim member spaced below and outwardly projecting from the periphery comprises a radius portion when viewed in cross section.

* * * * *